Feb. 23, 1932.  G. F. WIKLE  1,846,044

TIRE BUILDING MACHINE

Filed Sept. 12, 1927

INVENTOR.
GEORGE F. WIKLE.
BY
Robert D. Harvey
ATTORNEY.

Patented Feb. 23, 1932

1,846,044

UNITED STATES PATENT OFFICE

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

TIRE BUILDING MACHINE

Application filed September 12, 1927. Serial No. 218,909.

My invention relates to tire building machines and more particularly to that type of building machine in which the carcass is built upon a substantially flat drum or former. It has for its object the provision of a device which will automatically apply a strip of material, such as the breaker strip, to the tire carcass on the drum without distorting tension.

In the accompanying drawings which illustrate one embodiment of my invention,

Figure 1:
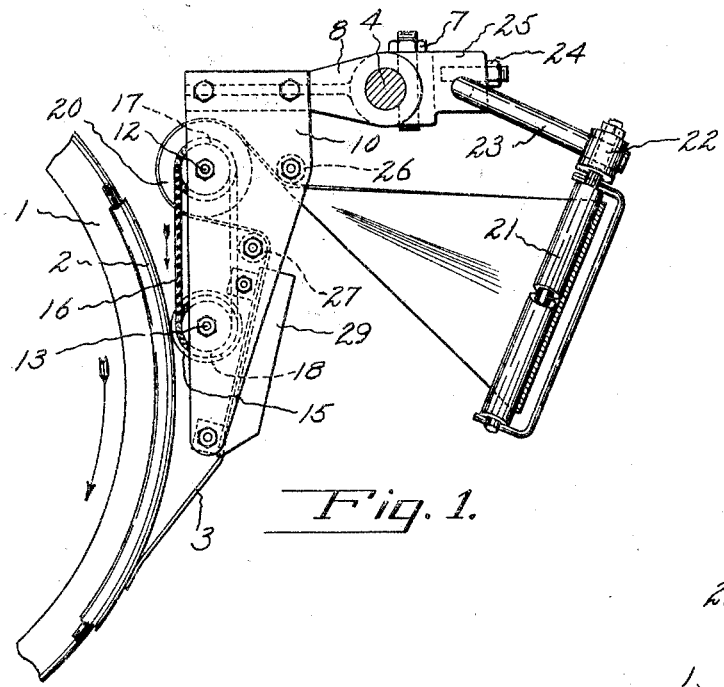
Fig. 1 is a side elevation of the device in operative relation to the building drum.
Figure 2:
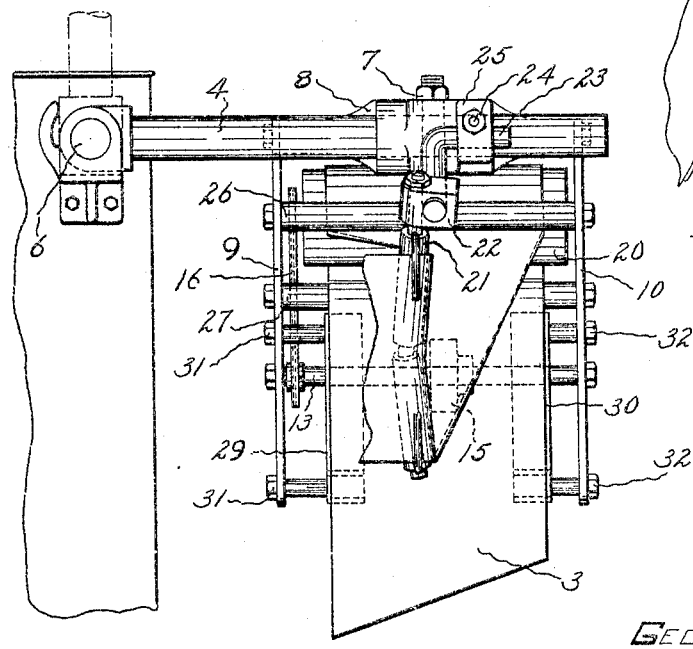
Fig. 2 is a plan view of the structures shown in Fig. 1, the drum being omitted.
Figure 3:
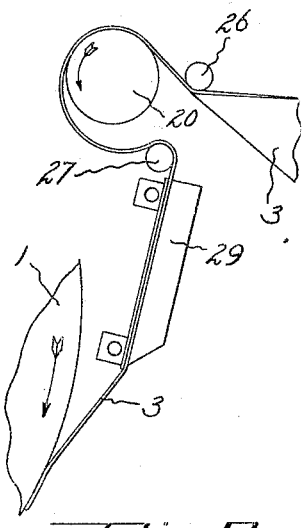
Fig. 3 is a diagrammatic detail view showing the manner of operation.

Referring to the drawings, 1 designates the drum or carcass supporting member of the tire building machine the carcass built thereon being indicated at 2. The strip, which it is the purpose of my device to apply to the tire carcass, is indicated at 3. The applying device is supported by any suitable means, such as rod 4, shown pivoted at 6 to the frame of the building machine. Adjustably secured to rod 4 by locking bolt 7 is a U-shaped casting 8 to which are bolted side plates 9 and 10 in which are journaled shafts 12 and 13. Shaft 13 carries a driving roll 15 adapted, when the device is in operating position as shown in Fig. 1, to engage the periphery of the carcass 2 on the drum to drive shaft 13. Shaft 12 is driven from shaft 13 by sprocket chain 16 passing around sprockets 17 and 18 secured, respectively, to shafts 12 and 13. Shaft 12 carries strip feeding roll 20 of greater diameter than driving roll 15. The strip of material to be applied is drawn from a source of supply, not shown, at the side of the building machine and passes around a guide and centering roll 21 journaled in a block 22 adjustably secured to bent rod 23 which in turn is adjustably held by locking pin 24 in a rearwardly extending lug 25 formed integral with casting 8. From roll 21 the strip of material passes beneath a guide roll 26 journaled in the side plates 9 and 10 thence around roll 20 and over a guide roll 27 journaled in side plates 9 and 10. From guide roll 27 the strip passes over and between angularly shaped guide plates 29 and 30 secured, respectively, to the side plates 9 and 10 by bolts 31 and 32. As the strip leaves the guide plates it is applied to the carcass 2, as shown in Fig. 1. As will be understood rotation of the drum in the direction shown by the arrow in Fig. 1 tends to draw strip 3 through the applying device. Roll 15 being in contact with the surface of the carcass on the drum is driven at the peripheral speed of the latter, and shaft 12, as previously described, is driven from shaft 13, but the roll 20 carried by shaft 12 is of greater diameter than the roll 15 and hence has an increased peripheral speed. Roll 20 therefore drives the strip forward at a greater rate than it is being applied to the carcass on the drum, and tends, as shown in Fig. 3, to form a loop below the roll thus releasing the strip from the driving action of the roll 20 until the slack has been applied to the tire carcass. The slackening of the strip beneath driving roll 20 permits the application of the strip without distorting tension.

Having thus described my invention, I claim:

1. A device for applying a breaker strip to a tire carcass while the latter is supported on a substantially flat rotatable drum which comprises a strip guide adapted to be positioned adjacent the drum, means to adjust the guide transversely of the drum to center the strip on the tire carcass, a roll associated with the guide positioned to engage the surface of the tire carcass and to be driven thereby, a strip feeding roll about which a strip is adapted to pass to the guide, an adjustable spreading roll positioned to operate substantially in a plane at right angles to the axis of the feeding roll and to guide the strip thereto, and means operatively connecting the first named roll and the strip feeding roll to impart to the latter a surface speed in excess of the surface speed of the tire carcass.

2. A device for applying a breaker strip to a tire carcass while the latter is supported on a substantially flat rotatable drum which comprises a frame adapted to be positioned adjacent the drum, means to adjust the frame transversely of the drum, a strip guide adjustably carried by the frame, a second strip guide fixed to the frame, a roll journaled in the frame positioned to engage the surface of the tire carcass and to be driven thereby, a strip feeding roll about which a strip is adapted to pass from the adjustable guide to the fixed guide and means operatively connecting the first named roll and the strip feeding roll to impart to the latter a surface speed in excess of the surface speed of the tire carcass.

3. A device for applying a breaker strip to a tire carcass while the latter is supported on a substantially flat rotatable drum which comprises a frame adapted to be positioned adjacent the drum, a roll journaled in the frame positioned to engage the surface of the tire carcass and to be driven thereby, a strip feeding roll about which a strip is adapted to pass, means operatively connecting the first named roll and the strip feeding roll to impart to the latter a surface speed in excess of the surface speed of the tire carcass and a strip guide secured to the frame adjacent the strip feeding roll, said guide being so positioned with respect to the feeding roll that an accumulation of the strip between the feeding roll and the guide tends to lessen the excess feed of the strip by the feed roll.

GEORGE F. WIKLE.